(12) United States Patent
Hon et al.

(10) Patent No.: US 9,669,670 B2
(45) Date of Patent: Jun. 6, 2017

(54) PUMP

(75) Inventors: David Tak-Wei Hon, Guangdong (CN);
Ken Chen, Guangdong (CN);
Dongming Huang, Guangdong (CN)

(73) Assignee: Dahon Technologies, LTD. (CN)

( * ) Notice: Subject to any disclaimer, the term of this patent is extended or adjusted under 35 U.S.C. 154(b) by 679 days.

(21) Appl. No.: 14/343,546

(22) PCT Filed: Apr. 9, 2012

(86) PCT No.: PCT/CN2012/073639
§ 371 (c)(1),
(2), (4) Date: Jun. 18, 2014

(87) PCT Pub. No.: WO2013/033989
PCT Pub. Date: Mar. 14, 2013

(65) Prior Publication Data
US 2014/0308144 A1 Oct. 16, 2014

(30) Foreign Application Priority Data

Sep. 7, 2011 (CN) .......................... 2011 1 0266186

(51) Int. Cl.
*B60C 23/10* (2006.01)
*B62K 19/42* (2006.01)
*F04B 33/00* (2006.01)

(52) U.S. Cl.
CPC ............ *B60C 23/105* (2013.01); *B62K 19/42* (2013.01); *F04B 33/005* (2013.01)

(58) Field of Classification Search
CPC ...... F04B 33/005; B62K 19/42; B60C 23/105
See application file for complete search history.

(56) References Cited

U.S. PATENT DOCUMENTS

| | | | | |
|---|---|---|---|---|
| 4,842,290 A * | 6/1989 | Alioto | .................. | B60C 23/105 152/415 |
| 5,016,894 A * | 5/1991 | Alioto | .................. | B60C 23/105 152/415 |
| 5,127,804 A * | 7/1992 | Chappell | .................. | B62J 11/02 280/201 |
| 5,499,858 A * | 3/1996 | Her | ........................ | B62K 19/42 280/201 |
| 7,798,786 B2 * | 9/2010 | Robinson | .............. | F04B 33/005 280/201 |

FOREIGN PATENT DOCUMENTS

CN 1910367 2/2007
TW EP 2003047 A1 * 12/2008 ................ B62J 1/08

* cited by examiner

*Primary Examiner* — Devon Kramer
*Assistant Examiner* — Thomas Cash
(74) *Attorney, Agent, or Firm* — Colin P. Cahoon; Shaukat A. Karjeker; Carstens & Cahoon, LLP

(57) ABSTRACT

A manually operated pump for supplying air to a bicycle comprises an outer tube with one end closed and the other end open. A core tube slides in the outer tube and has a piston assembly on one end and an end socket on the other. There is a hose which slides in the core tube. One end of the hose is connects with an air needle, and the other end connects with an air nozzle assembly. The piston assembly comprises a piston, a piston ring, and a one-way valve communicating with the core tube and the outer tube. A narrowing port is formed in the end socket of the core tube. A foot stand is hinged on an outer side of the end socket of the core tube. The air needle has a head matching the narrowing port.

12 Claims, 12 Drawing Sheets

A

B

PUMP

TECHNICAL FIELD

The present invention relates to a manually operated pump for supplying air to a bicycle, and more particularly, to a portable pump installed on the bicycle.

BACKGROUND OF THE INVENTION

Along with the development of economy and technology, people's awareness and attitudes to the society and the environment have been changed, and bicycles are becoming an important part of people's life.

As for a bicycle, the maintenance of tires is very important, which is often ignored by people. The air pressure in the tire is found to be too low in cycling, which will affect the speed of the bicycle and will go against the maintenance of tires. So the portable pump is becoming more and more popular among bicycle enthusiasts.

The pump with single barrel in the prior art is the one with a long stroke. This kind of pump is detachable and can be installed on the frame of the bicycle, but the big size of it affects the use of the bicycle.

Another kind of miniature pump has a shorter stroke than the pump with single barrel. It can be removed from the bicycle conveniently and doesn't affect the use of the bicycle, but the amount of air pumped in one stroke is small due to the short stroke of the pump.

Chinese patent application NO. 200480041170.9 discloses a pump, which solves the two incompatible problems described above. The defects of the pump are that the foldable foot stand is apt to knock the rear frame assembly, and it is not easy to take out the connector and fix it on the valve of the tire.

SUMMARY OF THE INVENTION

The present invention is aimed at providing a portable pump with compact structure, which is convenient for using.

The object of the present invention is achieved by the following technical scheme:

A pump comprises an outer tube with one end closed and another end open; a core tube, which can slide in the outer tube and is provided with a piston assembly on one end; a hose connected with an air needle on one end and connected with an air nozzle assembly on another end, which can slide in the core tube. The piston assembly comprises a piston, a piston ring, and a one-way valve communicating with the core tube and the outer tube; an end socket is provided on another end of the core tube; a narrowing port is formed in the end socket of the core tube; a foot stand is hinged on outer side of the end socket of the core tube; and the air needle is provided with a head matching with the narrowing port.

Preferably, a limiting block is provided and fixed on the open end of the outer tube; intake holes and a center hole allowing the core tube to go through are provided in the limiting block; and the piston assembly slides between the closed end of the outer tube and the limiting block.

Preferably, the air nozzle assembly comprises a strut bracing, a pressing block disposed on end surface of the strut bracing, a rubber block of air nozzle, an air nozzle case and a pin disposed between the pressing block and the rubber block of air nozzle; one end of the pin is connected with the hose, and another end of the pin goes through the rubber block of air nozzle and is open to a vent hole of the air nozzle case; and the strut bracing can be rotatably connected with the air nozzle case.

Preferably, when the strut bracing rotates relative to the air nozzle case, top of the strut bracing will press the pressing block, driving the pin to move towards the vent hole of the air nozzle case.

Preferably, the pressing block, the pin and the rubber block of air nozzle are disposed inside the air nozzle case.

Preferably, the strut bracing is provided with a spring snap; the end socket of the core tube is provided with a groove matching with the spring snap; the strut bracing may be inserted in the end socket of the core tube.

Preferably, end of the foot stand bears against the air nozzle assembly; rotate the foot stand, and the end of the foot stand will push the strut bracing, forcing the spring snap of the strut bracing to break away from the groove of the end socket of the core tube.

Preferably, the end socket of the core tube and the foot stand may be contained in the outer tube.

Preferably, the pump further comprises a protecting cover; the protecting cover is connected to the open end of the outer tube; and the end socket of the core tube and the foot stand may be contained in the outer tube.

Preferably, a clamping mechanism for clamping a saddle is provided at the closed end of the outer tube.

The present invention provides a pump with structure different from that of the prior art. The air nozzle assembly, the connection of the end socket of the core tube and the strut bracing are constructed in such ways to make the structure of the pump compact. On condition that the efficiency of air inflation is guaranteed, length of the pump is reduced. The top of the foot stand bears against the lower end of the step of the strut bracing or bears against the air nozzle case, which can limit the random rotation of the foot stand, and make it easy to take out the air nozzle assembly through the foot stand to inflate the tire. The protecting cover of the pump provides full protection for the components of the pump. The structure of the air nozzle assembly ensures that the pump and the air nozzle are connected together reliably, and makes inflating more convenient.

DETAILED DESCRIPTION OF THE PREFERRED EMBODIMENTS

Figure 1:
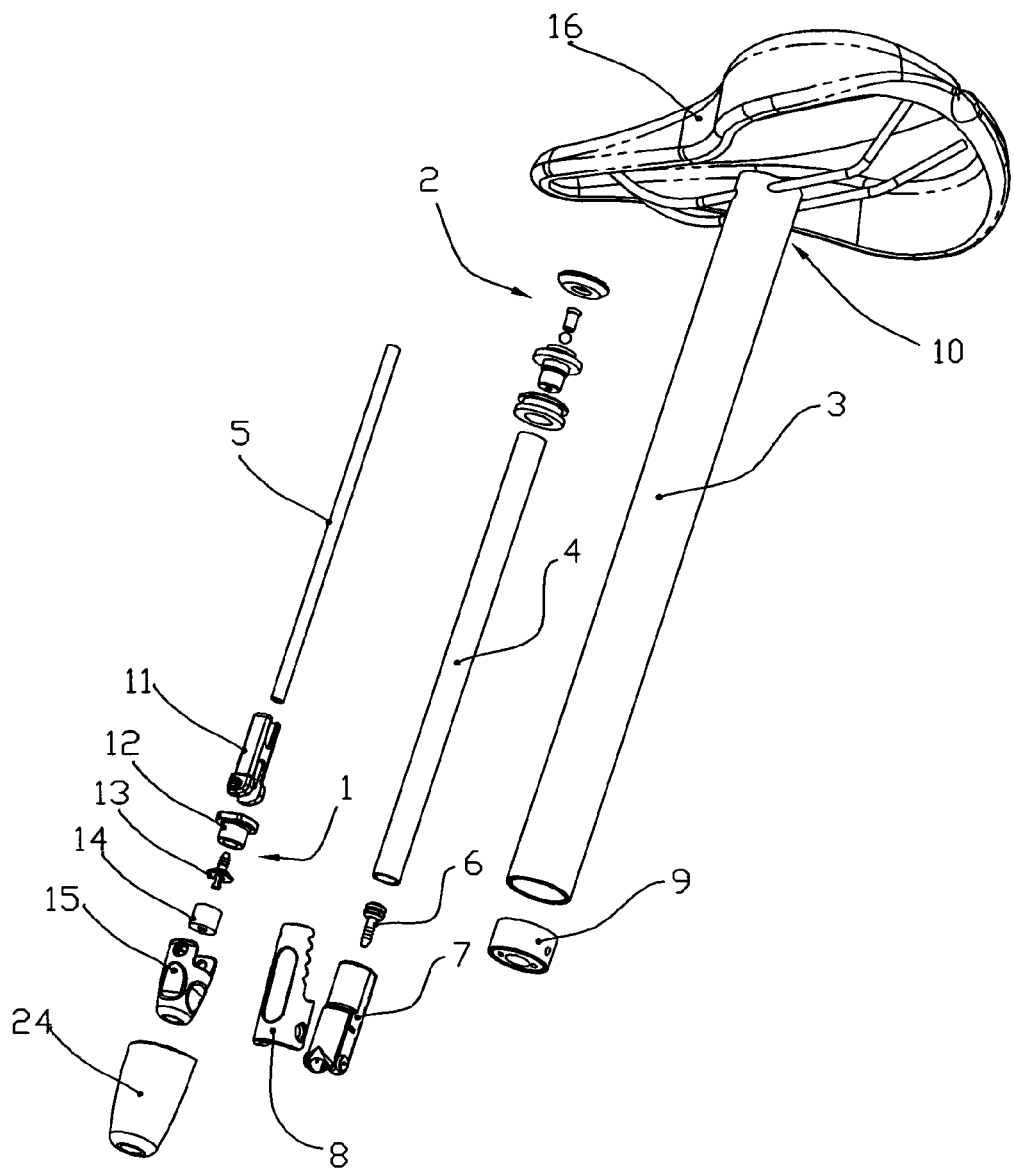
FIG. 1 is an exploded view illustrating the pump of the present invention.
Figure 2:
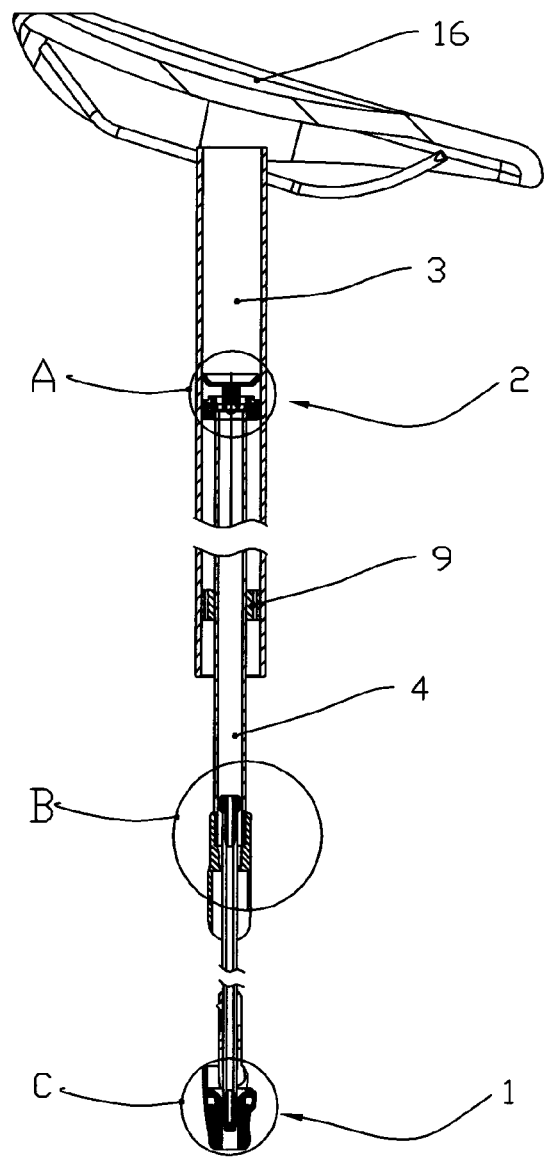
FIG. 2 is an assembly view illustrating the pump of the present invention.

As shown in FIGS. 1 and 2, the pump of the present invention comprises an outer tube 3, a core tube 4, a hose 5, a piston assembly 2 and an air nozzle assembly 1.

Figure 3:
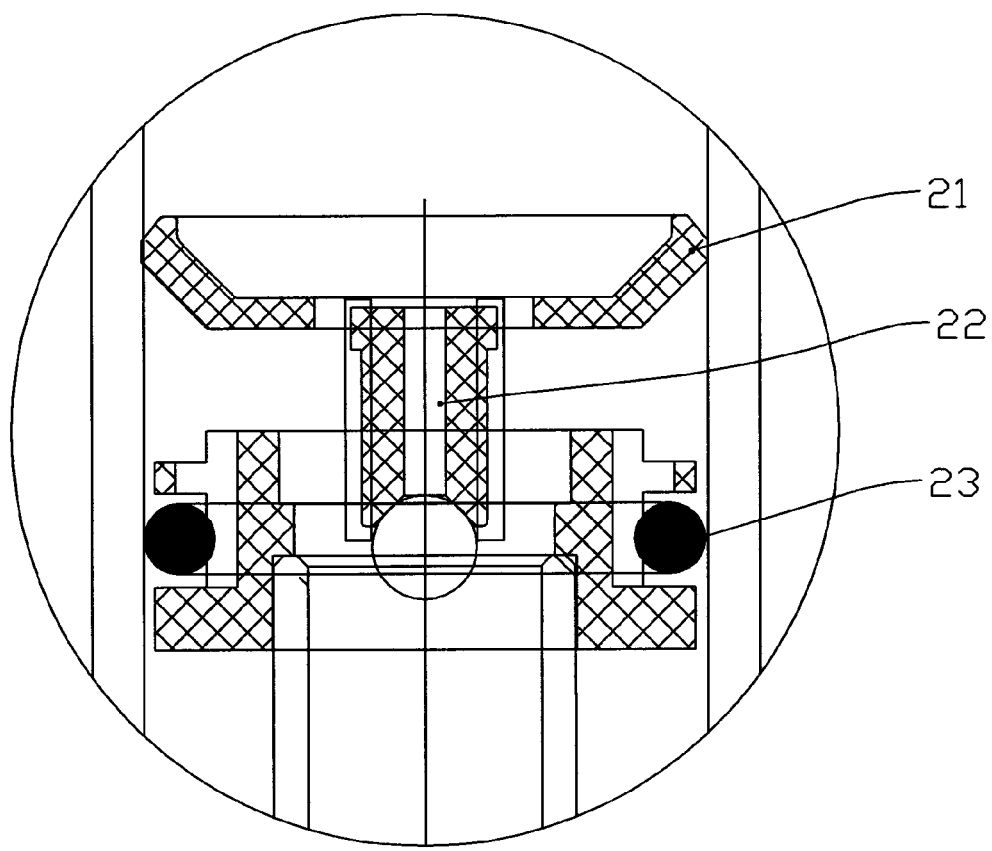
FIG. 3 is an enlarged view illustrating the piston assembly of the pump of the present invention.
Figure 4:
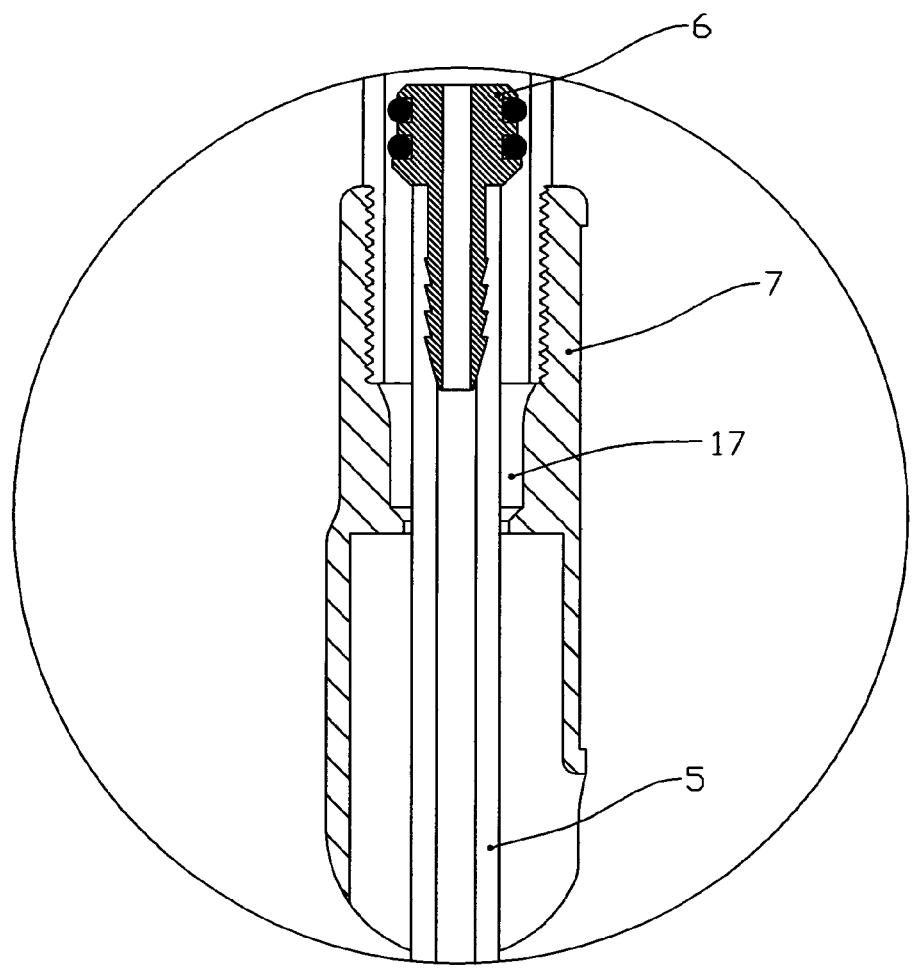
FIG. 4 is an enlarged view illustrating the assembly of the end socket of the core tube and the air needle in the pump of the present invention.
Figure 5:
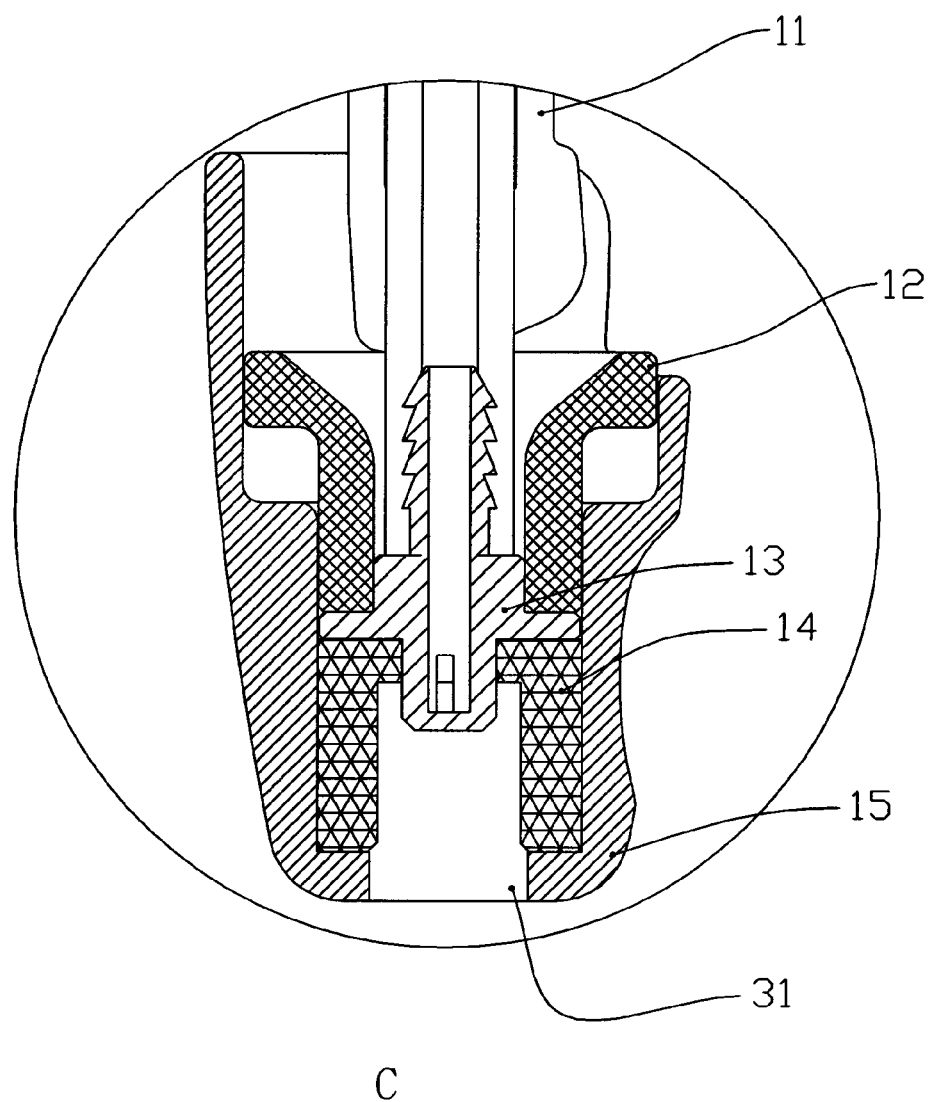
FIG. 5 is an enlarged view illustrating the air nozzle assembly of the pump of the present invention.
Figure 6:
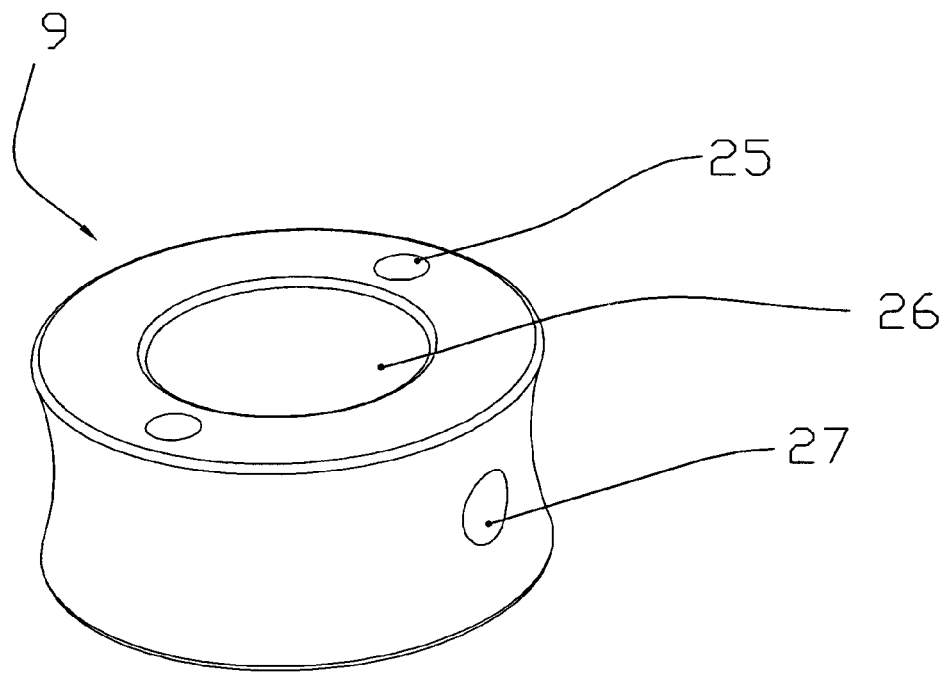
FIG. 6 is perspective view illustrating the limiting block of the pump of the present invention.

One end of the outer tube 3 is closed and the other end is open. The core tube 4 can slide in the outer tube 3. The core tube 4 is provided with the piston assembly 2 on one end. The open end of the outer tube 3 is provided with a limiting block 9 for enclosing the piston assembly 2 in the outer tube 3. As shown in FIG. 6, the limiting block 9 has a center hole 26 in the center, which enables the core tube 4 to go through but stops the piston assembly 2 running through. Intake holes 25 are provided in side wall of the center hole. The intake holes 25 are connected to the closed segment of the outer tube 3 and open to atmosphere. Installing holes 27 are provided in the side wall of the limiting block 9. The limiting block 9 is fixed in the outer tube 3 through screws installed in the installing holes 27. As shown in FIG. 3, the piston assembly 2, which can slide in the outer tube 3, comprises a piston 21, a deformable piston ring 23, and a one-way valve 22. As shown in FIG. 4, an end socket 7 is provided on the other end of the core tube 4. A narrowing port 17 is formed in the end socket 7 of the core tube to contain an air needle 6. A foot stand 8 is hinged on outer side of the end socket 7 of the core tube. One end of the air needle 6 is provided with a head, which is provided with sealing rings. When the head of the head is contained in the narrowing port 17 of the end socket 7 of the core tube, the air needle 6 seals the end socket 7 of the core tube. The other end of the air needle 6 is a slim connecting end, which is sleeved by the hose. A through hole is provided inside the air needle 6 to allow the air in the core tube 4 to flow into the host 5. The other end of the host 5 is connected with the air nozzle assembly 1. As shown in FIG. 5, the air nozzle assembly 1 comprises a strut bracing 11, a pressing block 12 disposed on end surface of the strut bracing 11, a rubber block 14 of air nozzle, an air nozzle case 15 and a pin 13 disposed between the pressing block 12 and the rubber block 14 of air nozzle. One end of the pin is connected with the hose 5, and the other end of the pin goes through the rubber block 14 of air nozzle and is open to a vent hole 31 of the air nozzle case 15. The strut bracing 11 can be rotatablely connected with the air nozzle case 15. The pressing block 12, the pin 13 and the rubber block 14 of air nozzle are all disposed inside the air nozzle case 15. When the strut bracing 11 rotates relative to the air nozzle case 15, a cam mechanism on the end surface of the strut bracing 11 will press the pressing block 12, driving the pin 13 to press the rubber block 14 of air nozzle towards the vent hole 31 of the air nozzle case 15, forcing the rubber block 14 of air nozzle to deform, and forcing the pin 13 to move towards the vent hole 31 of the air nozzle case 15.

Figure 7:
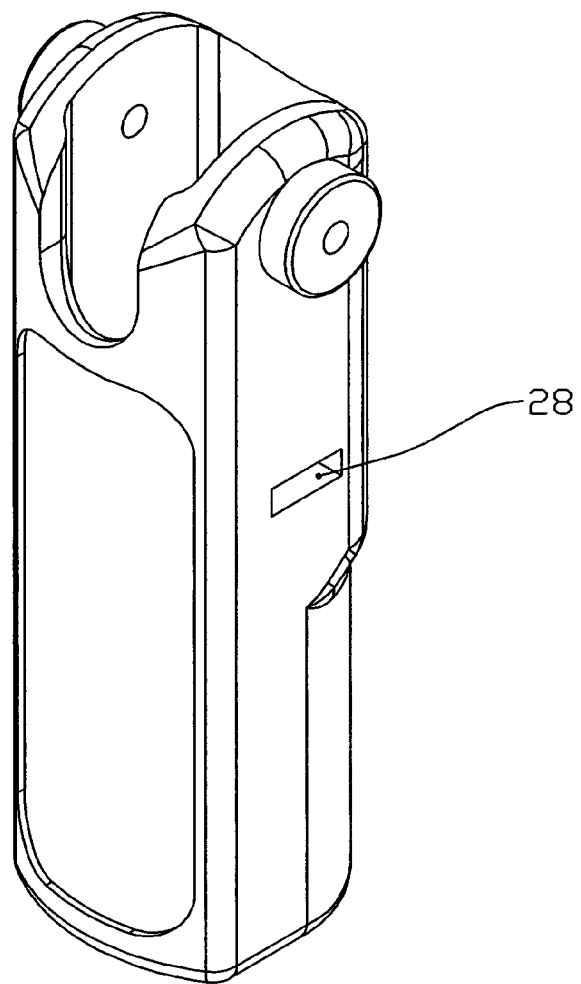
FIG. 7 is perspective view illustrating the end socket of the core tube in the pump of the present invention.
Figure 8:
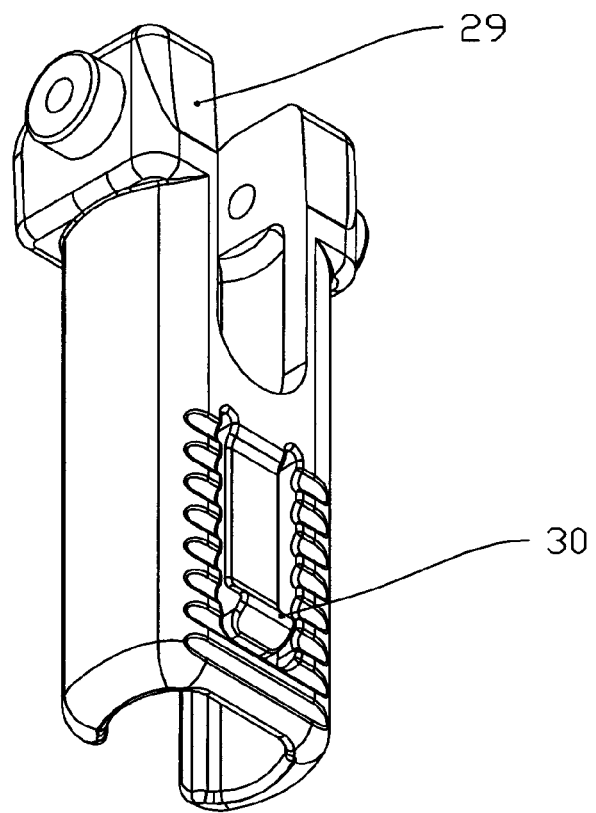
FIG. 8 is perspective view illustrating the strut bracing of the pump of the present invention.
Figure 9:
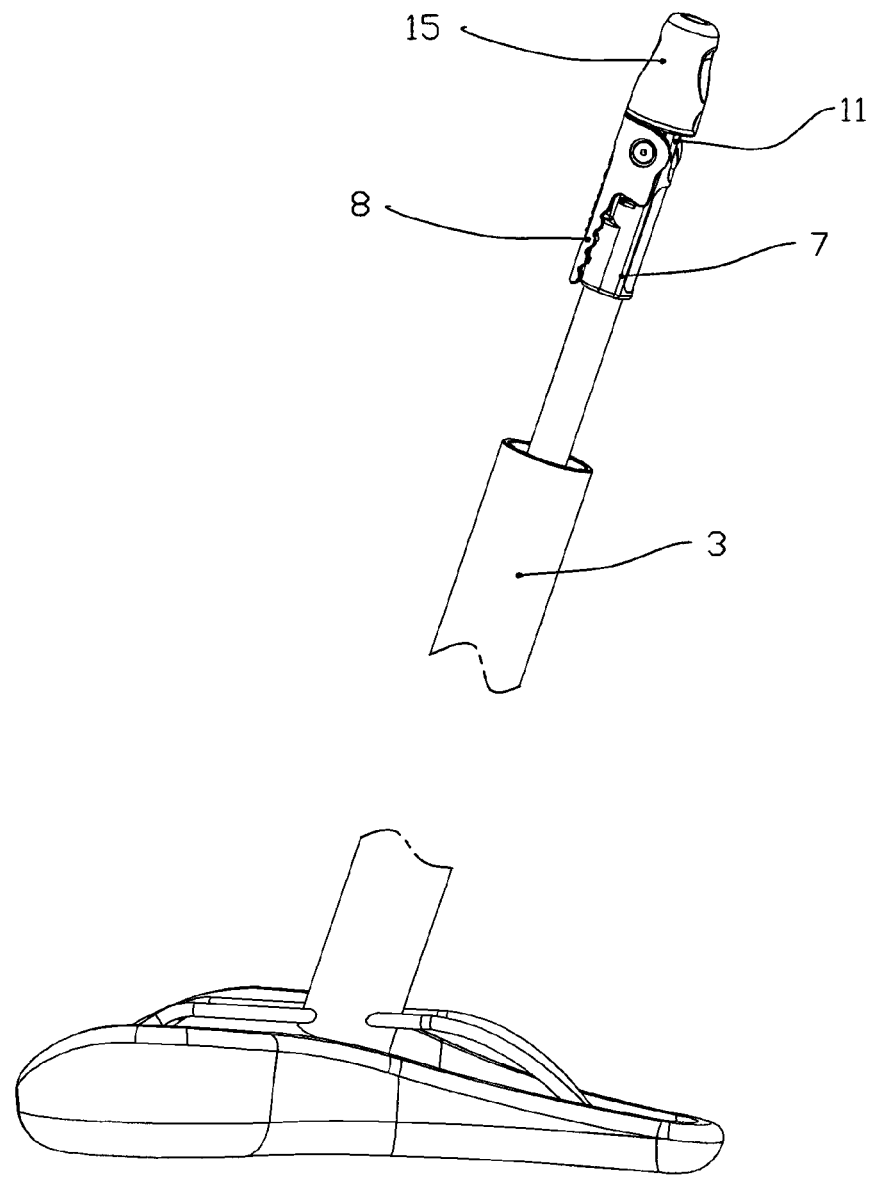
FIG. 9 is a schematic view illustrating the air nozzle assembly of the pump of the present invention before the air nozzle assembly is removed.
Figure 10:
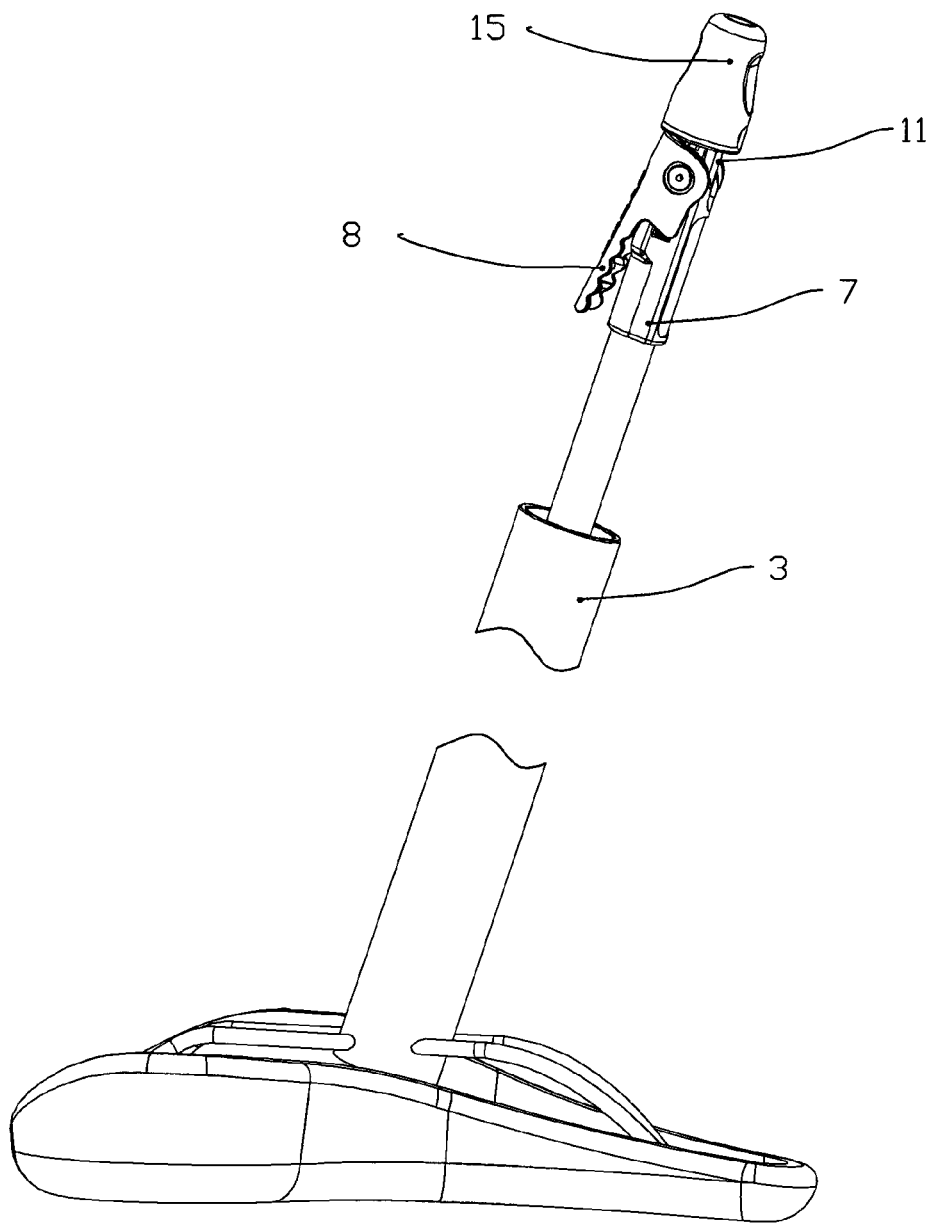
FIG. 10 is a schematic view illustrating the air nozzle assembly of the pump of the present invention while the air nozzle assembly is being removed.

The strut bracing 11 may be inserted in the end socket 7 of the core tube. As shown in FIG. 8, upper end of the strut bracing 11 is provided with a step 29, and lower end of the strut bracing 11 is provided with a spring snap 30. As shown in FIG. 7, the end socket 7 of the core tube is provided with a groove 28 matching with the spring snap 30. FIG. 9 is a schematic view illustrating the air nozzle assembly of the pump of the present invention before the air nozzle assembly is removed, and FIG. 10 is a schematic view illustrating the air nozzle assembly of the pump of the present invention while the air nozzle assembly is being removed. As shown in FIGS. 9 and 10, when the strut bracing 11 is inserted in the end socket 7 of the core tube, end of the foot stand 8 bears against the lower end of the step 29 of the strut bracing 11. Rotate the foot stand 8, and the end of the foot stand 8 will push the strut bracing 11, forcing the spring snap 30 of the strut bracing 11 to break away from the groove 28 of the end socket 7 of the core tube. Indeed, the end of the foot stand 8 may be provided towards the end of the air nozzle case 15. Rotate the foot stand 8 outwards, and the end of the foot stand 8 presses the end of the air nozzle case 15, forcing the strut bracing 11 to tend to move for the reason that the air nozzle case 15 is connected with the strut bracing 11. When the foot stand 8 pushes the end of the air nozzle case 15, the force driving the strut bracing 11 is large enough to force the spring snap 30 to break away from the groove 28. Pull the strut bracing 11 out from the end socket 7 of the core tube, and inflate the tire with the pump.

The open end of the outer tube 3 is provided with internal screw thread, and the protecting cover 24 is provided with external screw thread. After the strut bracing 11 is installed in the end socket 7 of the core tube, the pump will have a compact structure and only small part of the air nozzle case 15 is exposed to outside of the outer tube 3. After the protecting cover 24 is connected with the outer tube 3 through threads, the air nozzle case 15 is kept in the outer tube 3 and the protecting cover 24, which ensures the safety of the pump and the beauty of the integral structure.

Figure 11:
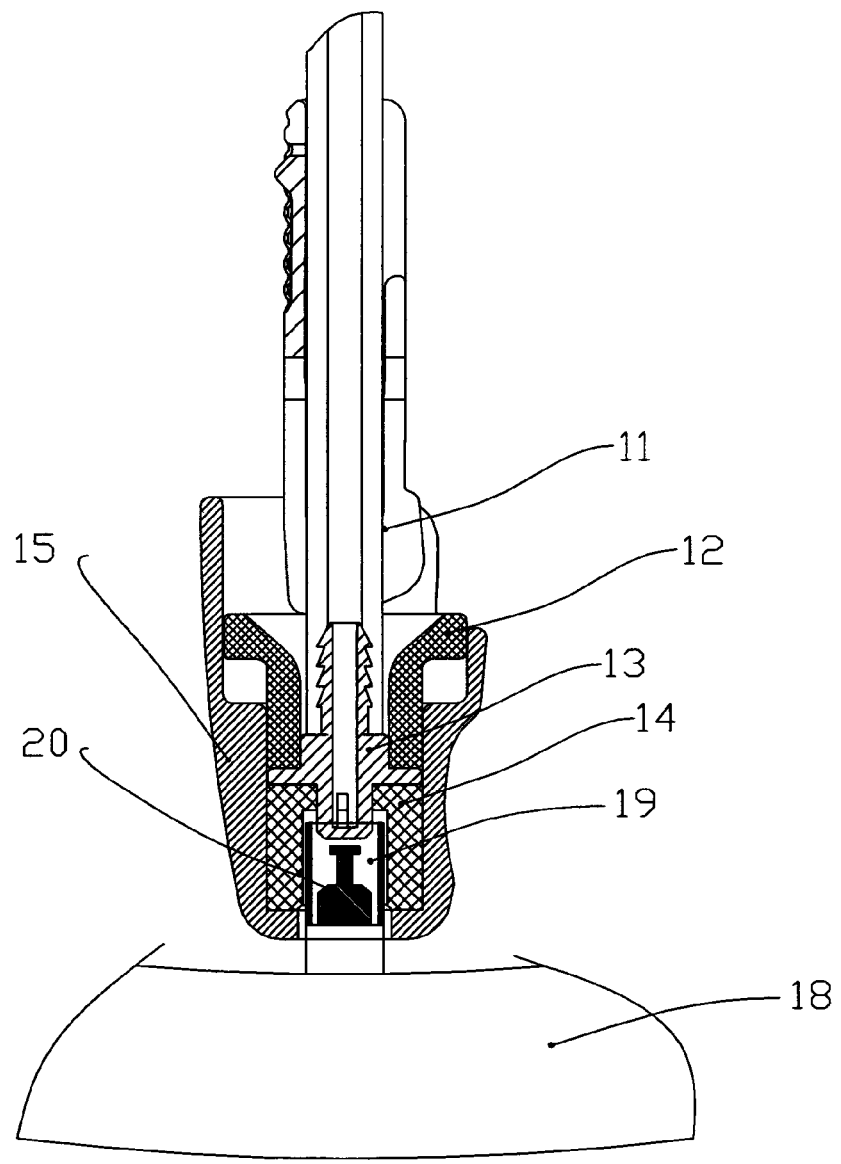
FIG. 11 is a schematic view illustrating the air nozzle assembly and the second air nozzle of the tire in the pump of the present invention before inflating.
Figure 12:
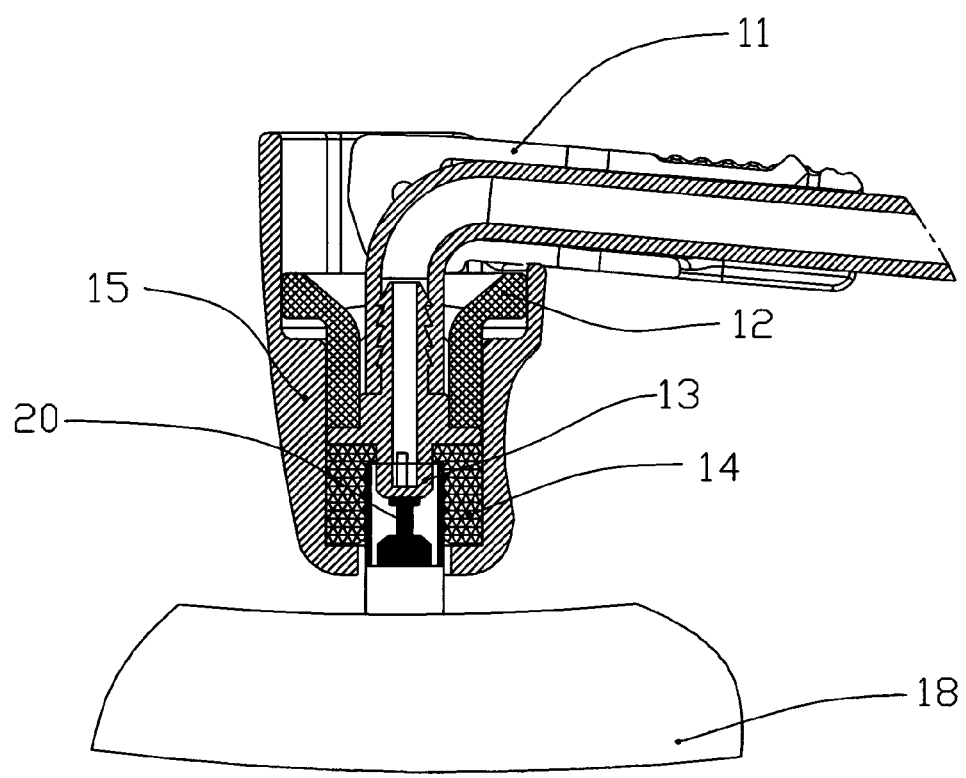
FIG. 12 is an assembly view illustrating the air nozzle assembly and the second air nozzle of the tire in the pump of the present invention.

As shown in FIGS. 11 and 12, during inflating the tire 18 with the pump, the air nozzle assembly 1 is disposed on a second air nozzle 19 of the tire 18. Rotate the strut bracing 11 to drive the pin 13 to push away a second pin 20 of the second air nozzle 19. When the piston assembly 2 moves towards the closed end of the outer tube 3, the air in the closed segment is compressed and the air pressure increases, so that the one-way valve 22 of the piston assembly 2 is pushed away and the air in the outer tube 3 runs through the core tube 4 and the host 5 and flows into the tire. When the piston assembly 2 moves towards the limiting block 9, the volume of the air in the outer tube increases and the air pressure decreases, so that the one-way valve 22 is shut off and the air runs through the intake holes in the limiting block 9 and space around the piston assembly 2, and flows into the closed segment of the outer tube 3. Compress the air and the one-way valve 22 is opened, and just like that, the tire is inflated time and again. In this embodiment, only if the hose 5 is pulled from the core tube 4 to a limited position, namely, only if the head of the air needle 6 is contained in the narrowing port 17 of the end socket 7 of the core tube, can the core tube 4 be ensured to be isolated from the atmosphere, so as to enable the core tube 4 to communicate with the hose 5 through the end socket 7 of the core tube.

A portable structure is provided at the closed end of the outer tube 3 for the convenience of using the pump. The pump of the present invention may be installed on the seat post, and the seat post serves as the outer tube 3. A clamping mechanism 10 for clamping the saddle 16 is provided at the closed end of the outer tube 3.

What is claimed is:
1. A pump, comprises:
an outer tube (3) with one end closed and another end open;

a core tube (4), slidable within the outer tube (3), and is provided with having a piston assembly (2) on one end, the piston assembly (2) including a piston (21), a piston ring (23), and a one-way valve (22) communicating with the core tube (4) and the outer tube (3), the core tube having, on another end thereof, an end socket (7) with a narrowing port (17) formed therein;

a hose (5) connected with an air needle (6) on one end and connected with an air nozzle assembly (1) on another end, the hose slidable within the core tube (4) the air needle (6) having a head matching with the narrowing port (17); and a foot stand (8) is hinged on an outer side of the end socket (7) of the core tube;

wherein the air nozzle assembly (1) comprises
  a strut bracing (11) insertable into the end socket (7) of the core tube, the strut bracing provided with a spring snap (30) matching the groove (28) of the end socket (7),
  a pressing block (12) disposed on an end surface of the strut bracing,
  a rubber block (14) of air nozzle,
  an air nozzle case (15) rotatably connected to the strut bracing (11), and
  a pin (13) disposed between the pressing block (12) and the rubber block (14) of the air nozzle, one end of the pin (13) connected with the hose (5), and another end of the pin extending through the rubber block (14) and open to a vent hole (31) of the air nozzle case (15); and
whereby, when the end of the foot stand (8) bears against the air nozzle assembly (1), the foot stand (8) rotates and the end of the foot stand (8) pushes the strut bracing (11) thereby forcing the spring snap (30) of the strut bracing (11) to break away from the groove (28) of the end socket (7) of the core tube.

2. The pump according to claim 1, further comprising a limiting block (9) fixed on the open end of the outer tube (3); the limiting block having intake holes (25) and a center hole (26) allowing the core tube (4) to go through; whereby the piston assembly slides between the closed end of the outer tube (3) and the limiting block (9).

3. The pump according to claim 1, wherein, when the strut bracing (11) rotates relative to the air nozzle case (15), a top of the strut bracing (11) will press the pressing block (12), driving the pin (13) to move towards the vent hole (31) of the air nozzle case (15).

4. The pump according to claim 3, wherein the pressing block (12), the pin (13) and the rubber block (14) of the air nozzle are disposed inside the air nozzle case (15).

5. The pump according to claim 2, wherein the end socket (7) of the core tube and the foot stand (8) may be contained in the outer tube (3).

6. The pump according to claim 5, wherein the pump further comprises a protecting cover (24), the protecting cover (24) connected to the open end of the outer tube (3); and wherein the end socket (7) of the core tube and the foot stand (8) may be contained in the outer tube (3).

7. The pump according to claim 1, further comprising a clamping mechanism (10) for clamping a saddle (16) is provided at the closed end of the outer tube (3).

8. The pump according to claim 2, further comprising a clamping mechanism (10) for clamping a saddle (16) is provided at the closed end of the outer tube (3).

9. The pump according to claim 3, further comprising a clamping mechanism (10) for clamping a saddle (16) is provided at the closed end of the outer tube (3).

10. The pump according to claim 4, further comprising a clamping mechanism (10) for clamping a saddle (16) is provided at the closed end of the outer tube (3).

11. The pump according to claim 5, further comprising a clamping mechanism (10) for clamping a saddle (16) is provided at the closed end of the outer tube (3).

12. The pump according to claim 6, wherein, a clamping mechanism (10) for clamping a saddle (16) is provided at the closed end of the outer tube (3).

* * * * *